United States Patent
Goetzl et al.

(10) Patent No.: US 8,736,499 B2
(45) Date of Patent: May 27, 2014

(54) ANTENNA ENCLOSED WITHIN AN ANIMAL TRAINING APPARATUS

(75) Inventors: Brent A. Goetzl, Orinda, CA (US); Kevin Zinn, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 622 days.

(21) Appl. No.: 13/385,581

(22) Filed: Jan. 18, 2011

(65) Prior Publication Data

US 2013/0027207 A1      Jan. 31, 2013

Related U.S. Application Data

(60) Continuation-in-part of application No. 12/107,080, filed on Apr. 22, 2008, now Pat. No. 7,996,983, which is a division of application No. 11/386,413, filed on Mar. 22, 2006, now Pat. No. 7,382,328.

(51) Int. Cl.
   *H01Q 1/12*      (2006.01)
(52) U.S. Cl.
   USPC .......................................... 343/718; 343/873
(58) Field of Classification Search
   None
   See application file for complete search history.

(56) References Cited

U.S. PATENT DOCUMENTS

| | | | | |
|---|---|---|---|---|
| 4,794,402 A * | 12/1988 | Gonda et al. | | 119/720 |
| 4,802,482 A * | 2/1989 | Gonda et al. | | 119/720 |
| 5,054,428 A * | 10/1991 | Farkus | | 119/720 |
| 6,970,090 B1 | 11/2005 | Sciarra | | |
| 7,382,328 B2 * | 6/2008 | Lee et al. | | 343/718 |
| 2003/0169207 A1* | 9/2003 | Beigel | | 343/718 |
| 2005/0066912 A1 | 3/2005 | Korbitz et al. | | |
| 2007/0011339 A1 | 1/2007 | Brown | | |
| 2007/0204803 A1 | 9/2007 | Ramsay | | |
| 2008/0163827 A1* | 7/2008 | Goetzl | | 119/712 |
| 2009/0289844 A1 | 11/2009 | Palsgrove et al. | | |

* cited by examiner

*Primary Examiner* — Trinh Dinh
(74) *Attorney, Agent, or Firm* — Pitts & Lake, P.C.

(57) ABSTRACT

An animal training apparatus including an electrical conductor embedded within a flexible member, and a housing having a through-opening for receiving the electrical conductor therethrough. The flexible member is molded around the electrical conductor and the antenna, while the electrical conductor is positioned such that it extends into the housing through the through-opening. As a result of the molding process, the flexible member shields the housing through-opening, discouraging substances such as water from accessing the interior of the housing via the through-opening.

10 Claims, 10 Drawing Sheets

ANTENNA ENCLOSED WITHIN AN ANIMAL TRAINING APPARATUS

CROSS-REFERENCE TO RELATED APPLICATIONS

This application is a continuation-in-part of U.S. patent application Ser. No. 12/107,080, filed Apr. 22, 2008, now U.S. Pat. No. 7,996,983, which is a divisional of U.S. patent application Ser. No. 11/386,413, filed Mar. 22, 2006, now U.S. Pat. No. 7,382,328.

STATEMENT REGARDING FEDERALLY-SPONSORED RESEARCH OR DEVELOPMENT

Not Applicable

BACKGROUND OF THE INVENTION

1. Field of Invention

This invention relates to an external antenna for use with an electronic animal training device. More specifically, the invention relates to an antenna embedded within a flexible collar.

2. Description of the Related Art

There is a growing demand for animal collars that incorporate electronic components, such as transmitters, receivers, or transceivers. Generally, such an electronic component is protected by enclosing it in a housing that is integrated into the animal collar. It is well established that transmitters, receivers, and transceivers require an antenna to radiate or receive radio waves effectively. Generally, as the length of an antenna increases, the efficiency of an antenna increases. Lengthening the antenna often is the simplest way of increasing the range of a transmitter, receiver, or transceiver. A relatively long antenna, unlike a relatively short antenna, cannot be enclosed in the housing, however. Instead, such an antenna is external to the housing, and it conductively connects to the electronic component via a through-opening defined by the housing. An animal collar having an external antenna is disadvantaged in at least three respects. First, the antenna, itself, is more susceptible to damage because it protrudes from the housing and, therefore, is exposed to the elements, among other things. Second, the interface of the antenna and the housing, i.e., the through-opening, provides another avenue for water to penetrate the housing and potentially harm any electronic components therein. Finally, an external antenna can impede the movement of an animal in certain environments. For example, underbrush can easily snag an external antenna.

BRIEF SUMMARY OF THE INVENTION

An antenna enclosed within an animal training apparatus (hereinafter, "improved apparatus") and three methods for manufacturing certain of its components are provided. One embodiment of the improved apparatus includes a receiver, an antenna in conductive communication with the receiver, and a housing defining an interior and a through-opening. The interior of the housing is adapted to receive the receiver, and the through-opening is adapted to receive the antenna therethrough. This embodiment includes further a flexible member that is formed by molding material around the housing and the antenna, while the antenna is positioned such that it extends through the through-opening. As a result of the molding process, part of the flexible member is bonded to the exterior of the housing, enabling the flexible member to carry the housing. That part of the flexible member, which at least partially encapsulates the housing, also shields the housing through-opening, discouraging substances such as water from accessing the interior of the housing via the through-opening. Additionally, flash resulting from that molding process fills the remainder of the through-opening, plugging it and securing the antenna therein. The flash serves as a secondary seal that further discourages substance such as water from accessing the interior of the housing via the through-opening. Finally, as a result of molding material around the antenna as well, the flexible member encloses and protects the part of the antenna that extends beyond the housing. In this embodiment, the flexible member has the form of a collar, enabling it to releasably secure the improved apparatus to the neck of an animal.

The improved apparatus of the present invention has three major advantages over a conventional animal training apparatus. First, the improved apparatus is more durable because the antenna is enclosed in the flexible housing and, therefore, is less susceptible to damage. Second, the improved apparatus is less likely than a conventional animal training apparatus to impede the movement of an animal because the antenna is enclosed in the collar, eliminating the chance that the antenna, itself, will be snagged. Third, a seal may be formed more readily at the interface of the antenna and the housing, thereby providing greater protection from the elements.

As stated previously, three methods for manufacturing certain components of the improved apparatus are provided also. The first method requires a flexible member mold that defines prong pairs. The prong pairs are engineered to grasp the antenna upon its placement in the flexible member mold, in preparation for the molding process that forms the flexible member. Accordingly, the antenna must be placed in the flexible member mold and secured by the prong pairs. This step ensures that the antenna, during the manufacture of the flexible member, remains in proper position relative to the housing and the through-opening. The second method of manufacture uses rigid placeholders to maintain the antenna in proper position in the flexible member mold. The rigid placeholders are formed by molding material around selected parts of the antenna. Thereafter, the antenna, including the attached rigid placeholders, is transferred to the flexible member mold, where the antenna is maintained in proper position by the rigid placeholders. The third method uses a flexible placeholder to maintain the antenna in proper position in the flexible member mold. In one embodiment, the flexible placeholder, itself, is manufactured first by stretching the antenna so that it has no give or slack and suspending it in a flexible placeholder mold. Next, uncured material is injected into the flexible placeholder mold, where it surrounds the desired section of the antenna while assuming the overall form of the flexible placeholder. The material is cured, forming the flexible placeholder, which has a section of the antenna enclosed therein and which defines a plurality of alignment holes and bosses. The flexible placeholder, including the antenna, is transferred to the flexible member mold, where it is maintained in proper position using the alignment holes and bosses, in preparation for the molding process that forms the flexible member.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

An antenna enclosed within an electronic animal training apparatus (hereinafter, "improved apparatus") is disclosed, as are various methods of manufacture.

Figure 1:
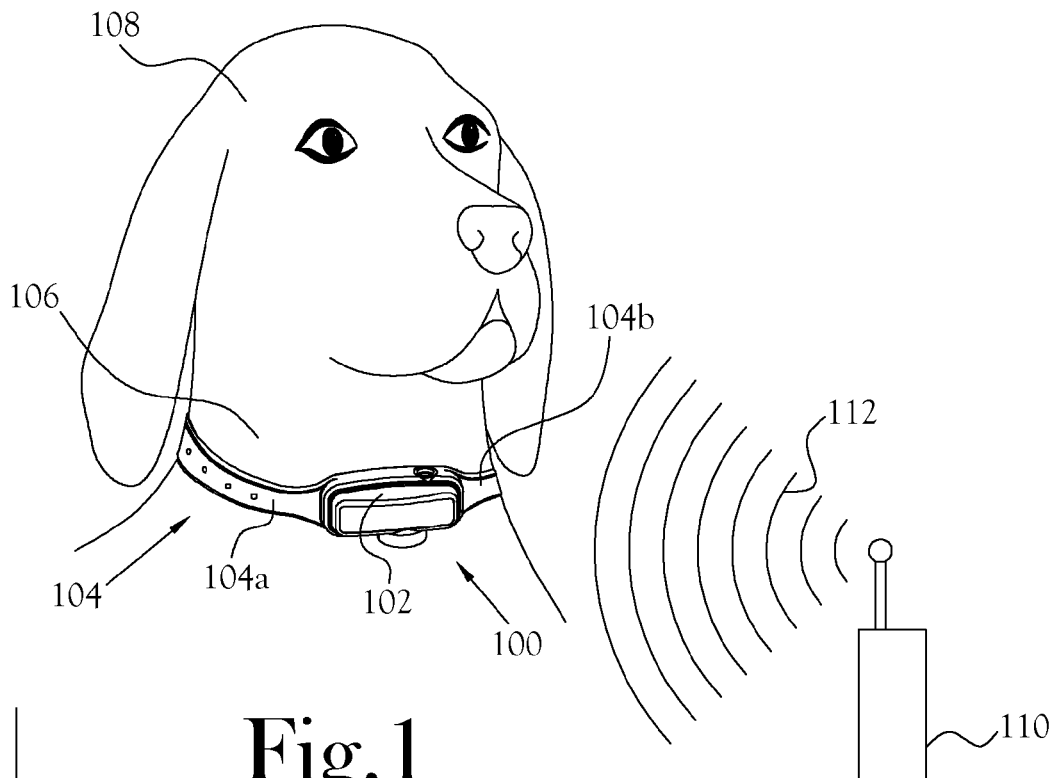
FIG. 1 depicts an animal wearing of an embodiment of the apparatus of the present invention.

FIG. 1 depicts an animal 108 wearing an embodiment of the improved apparatus 100, which includes the housing 102 and the flexible attachment member 104, having one or more flexible members 104a, 104b. The housing 102 is adapted to receive therein an electronic component (not shown) for communicating via radio waves 112 with a remote electronic device 110, such as a transmitter. The housing 102 is attached to the flexible members 104a, 104b, which, in this embodiment, forms a collar adapted to encircle a neck 106 of an animal 108 and to releasably secure the improved apparatus 100 to the animal 108. It is worth noting that the electronic component (not shown) is conductively connected to the antenna (not shown), which is not visible in this view because it is enclosed within the flexible attachment member 104. One skilled in the art will recognize that the flexible attachment member may be adapted to encircle a part of the animal 108 other than the neck 106. One skilled in the art will recognize also that any of a variety of electronic components may be enclosed in the housing 102, including a receiver, transceiver, or transmitter.

Figure 2:
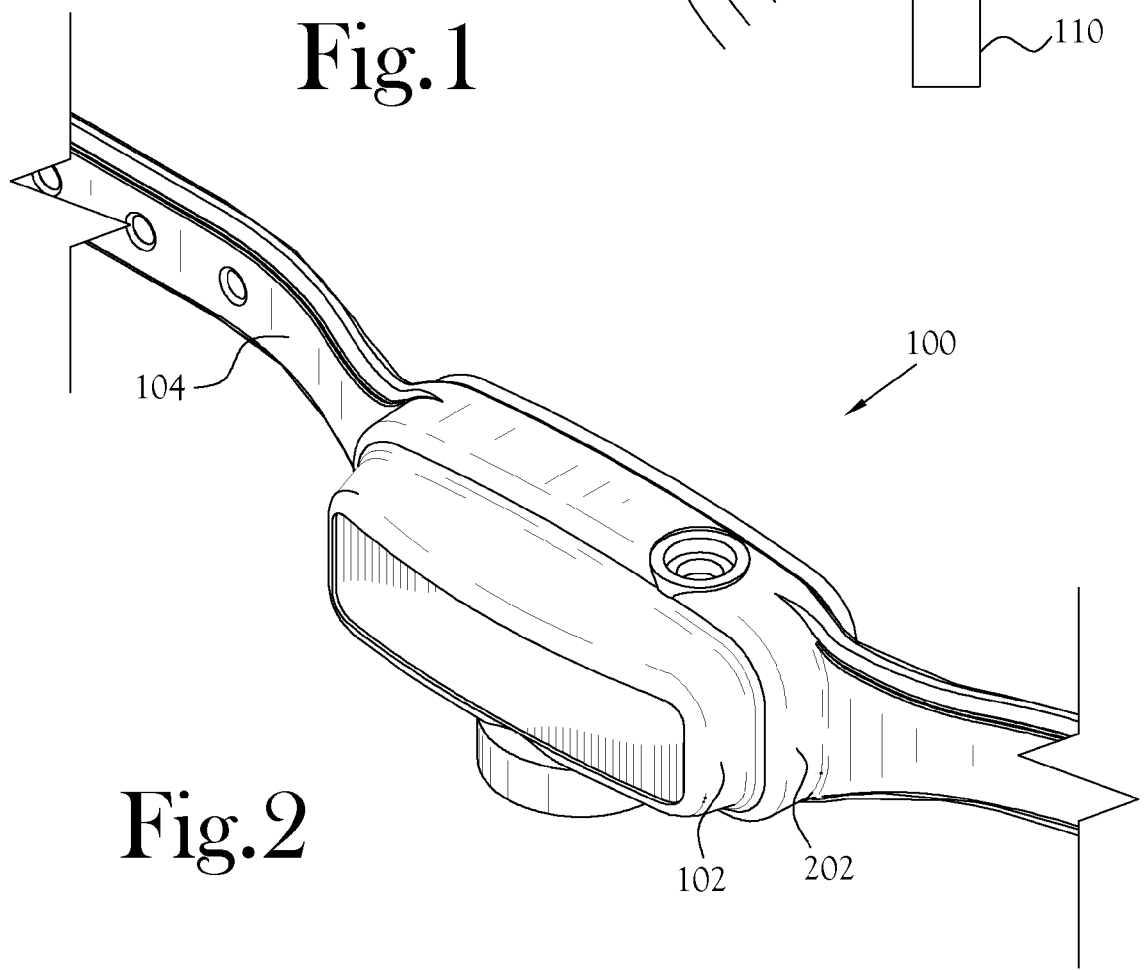
FIG. 2 is a front perspective view of the embodiment of the apparatus of the present invention depicted in FIG. 1.

FIG. 2 is a front perspective view of the embodiment of the improved apparatus 100 depicted in FIG. 1. FIG. 2 shows that the housing 102 and the flexible member 104 are attached to each other. As set forth in greater detail later in the specification, the flexible member 104 is formed by molding material (e.g., plastic or other polymeric material) around the housing 102 and the antenna (not shown). As a result, the band 202 defined by the flexible member 104 has a form that is complementary to the housing 102, thereby enabling the flexible member 104 to be attached to, and carry, the housing 102. Again, it is worth noting that the electronic component (not shown) enclosed in the housing 102 is conductively connected to the antenna (not shown), which is not visible in this view because it is enclosed within the flexible member 104. One skilled in the art will recognize that the improved apparatus may include components necessary for applying a corrective stimulus to the animal, thereby enabling the improved apparatus to be used in training/containment/access applications and in various corrections. Additionally, one skilled in the art will recognize that, in certain applications, the improved apparatus is not advantaged by including such components. For example, in an improved apparatus that is engineered merely to transmit a signal disclosing the location of the animal, such components are unnecessary.

Figure 3:
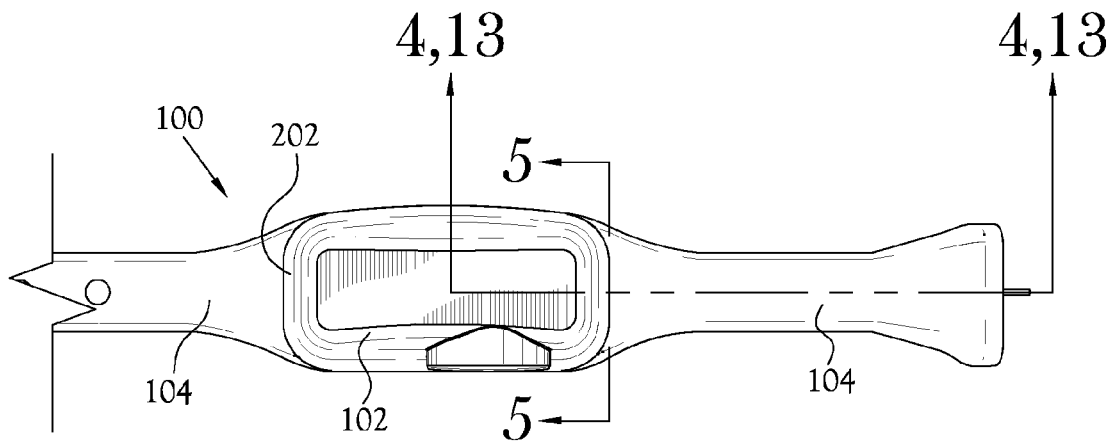
FIG. 3 is a top plan view of the embodiment of the apparatus of the present invention depicted in FIG. 1.

FIG. 3 is a top plan view of the embodiment of the improved apparatus depicted in FIGS. 1, 2. FIG. 3 serves as a reference for the partial cross-sectional views of the improved apparatus depicted in FIGS. 4, 5, and 13.

Figure 4:
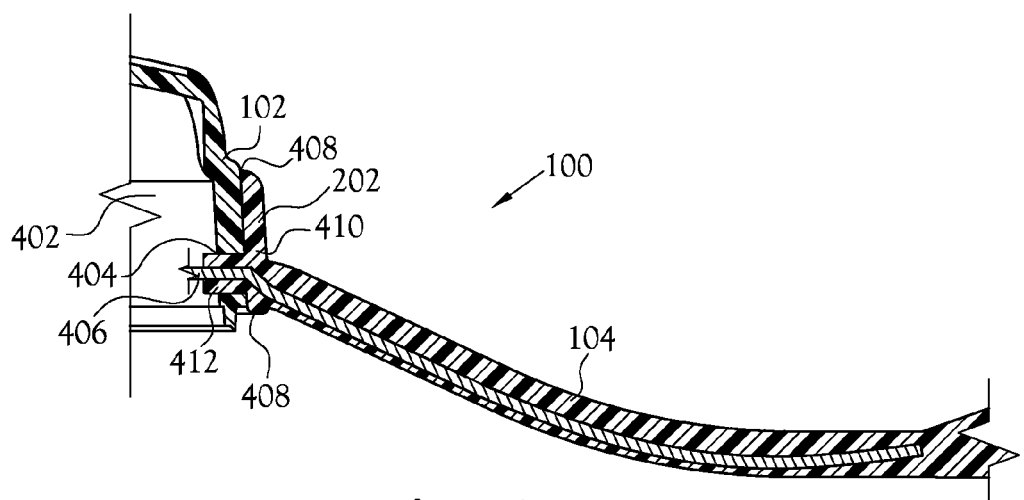
FIG. 4 is an enlarged partial cross-sectional view, taken along lines 4-4 of FIG. 3, of the apparatus of the present invention.

FIG. 4 is a partial cross-sectional view of the embodiment of the improved apparatus 100, taken along lines 4-4 of FIG. 3. The housing 102 is composed of a hard material, and it defines an interior 402 and a through-opening 404. The housing 102 is engineered to enclose at least one electronic component (not shown) in the interior 402, and the through-opening 404 is engineered to receive the antenna 406 therethrough so that the antenna 406 is able to conductively connect to an electronic component (not shown) enclosed in the housing 102. One skilled in the art will recognize that an electrical conductor other than an antenna may be suitable for certain applications. The flexible member 104, which in this embodiment is composed of plastic, completely encloses the antenna 406, protecting it from damage. Because the flexible member 104 is formed by molding material around the housing 102 and the antenna 406, the interface 408 between the housing 102 and the first end 410 of the flexible member 104 is sealed, preventing water or another substance from penetrating the housing 102 via the through-opening 404. Additionally, the seal aids in preventing the water or another substance from harming the antenna 406. The seal has two components: a primary seal and a secondary seal. The primary seal is effected upon formation of the band 202 of the flexible member 104. Because the band 202 is formed by molding material around the housing 102, the interior surface of the band 202 and the exterior surface of the housing 102 bond along the entire interface 408, significantly reducing the ability of water or another substance to penetrate the interface 408. The secondary seal is effected upon formation of the flexible member flash 412, a byproduct of the molding process that forms the flexible member 104. The through-opening 404 has a diameter selected to enable formation, during the molding process, of the flexible member flash 412. The flexible member flash 412 fills the through-opening 404, plugging it, thereby providing a secondary seal for protection in the event that water or another substance breaches the primary seal. One skilled in the art will recognize that the length and thickness of the flexible member flash 412 may be modified by altering the diameter of the through-opening 404.

Figure 5:
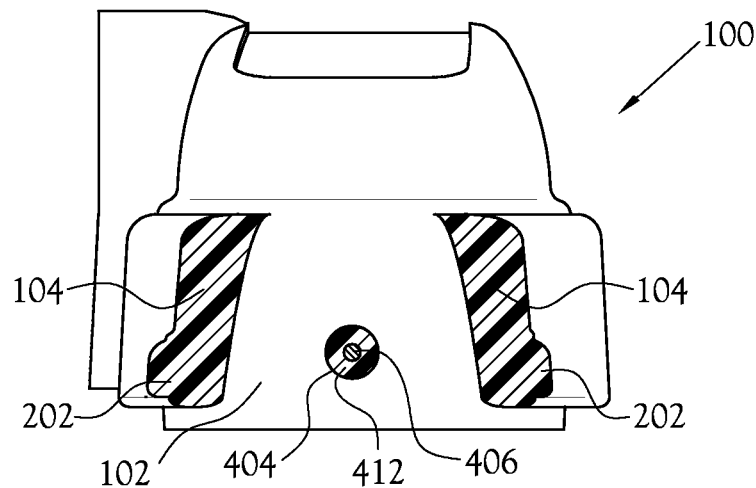
FIG. 5 is an enlarged partial cross-sectional view, taken along lines 5-5 of FIG. 3, of the apparatus of the present invention.

FIG. 5 is a partial cross-sectional view, taken along lines 5-5 of FIG. 3, of the embodiment of the improved apparatus 100 depicted in FIG. 4. FIG. 5 further discloses the configuration of the housing 102, the flexible member 104, the through-opening 404, the flexible member flash 412, and the antenna 406.

Figure 6:
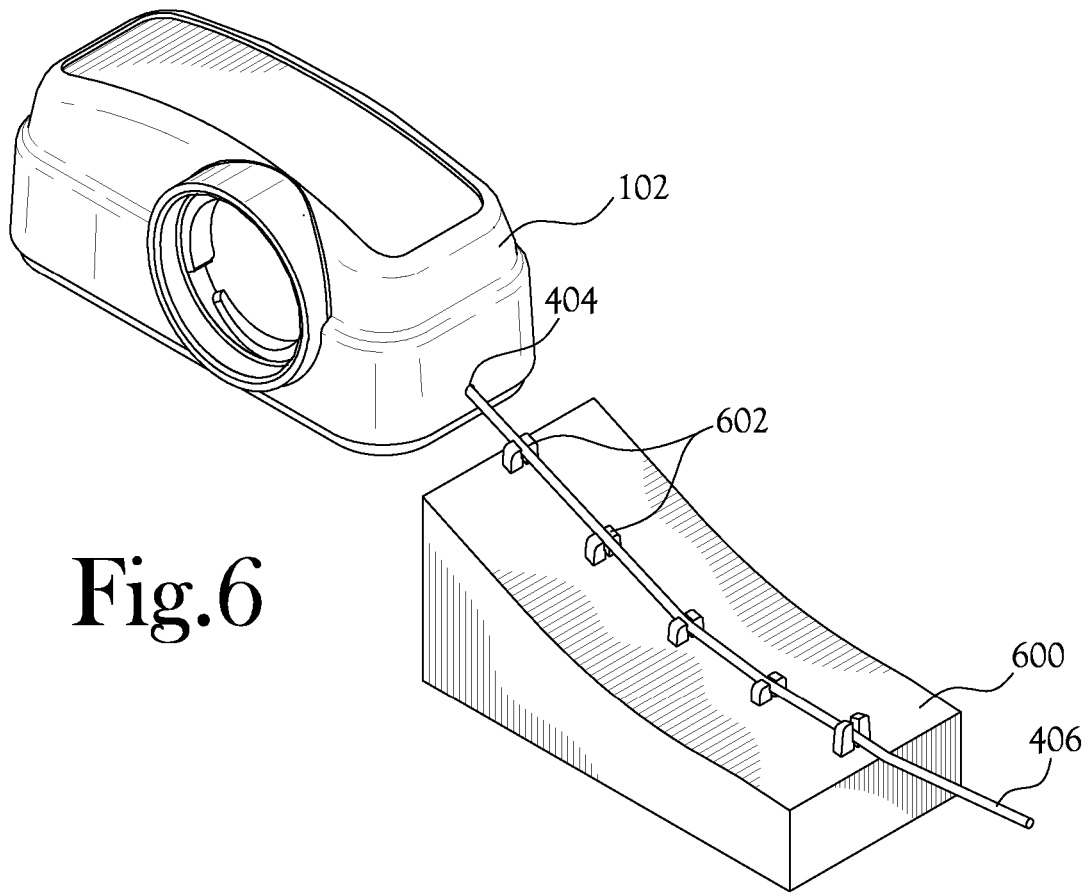
FIG. 6 is a partial perspective view of the flexible member mold that defines the prong pairs.

FIG. 6 relates to the first of the three methods presented herein for manufacturing the improved apparatus 100. The first method requires the flexible member mold 600 that defines the prong pairs 602. The prong pairs 602 are engineered to grasp the antenna 406 upon its placement in the flexible member mold 600, in preparation for the molding process that forms the flexible member 104. Accordingly, the antenna 406 is placed in the flexible member mold 600 and is secured by the prong pairs 602. Also, the housing 102 is placed in the flexible member mold 600 and is secured in position. These steps ensure that the antenna 406, during the manufacture of the flexible member 104, remains in proper position relative to the housing 102, the through-opening 404, and the flexible member mold 600. It is critical to note that the entire flexible member mold 600 is not depicted in FIG. 6. Rather, only the part defining the prong pairs 602 is depicted to emphasize their importance to this method of manufacture. After the antenna 406 is secured in position using the prong pairs 602, uncured material is forced by an injection molding apparatus into the flexible member mold 600, where it surrounds the antenna 406 and selected parts of the housing 102. Thereafter, the uncured material is cured, forming the flexible member 102, within which the antenna 406 is enclosed.

Figure 7:
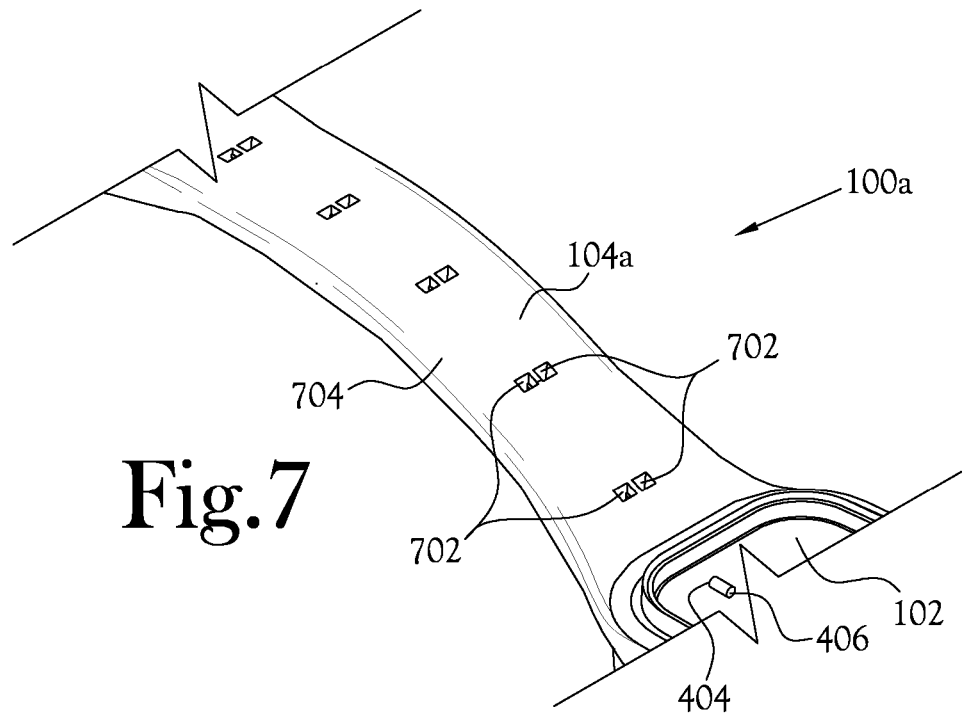
FIG. 7 is a partial view of an embodiment of the apparatus of the present invention that was manufactured using the flexible member mold that defines the prong pairs.

FIG. 7 depicts a partial view of an embodiment of the improved apparatus 100a manufactured using the first method, i.e., the method requiring the flexible member mold 600 that defines the prong pairs 602. FIG. 7 shows the flexible member 104a, the housing 102, the antenna 406, and the through-opening 404. Additionally, FIG. 7 shows the cavities 702 defined by the flexible member 104a. Each of the cavities 702 has a shape complementary to each of the prongs of the respective prong pairs 602 of the flexible member mold 600. The cavities 702 form only when the first molding method is used to manufacture the improved apparatus. Thus, FIG. 7 is useful in clarifying the relationship between the flexible member mold 600 that defines the prong pairs 602 and the resulting embodiment of the improved apparatus 100a. It is important to note that the cavities 702 in this embodiment are defined by the interior surface 704 of the flexible member 104a and not by the exterior (opposite) surface (not shown) of the flexible member. When an animal is wearing the improved apparatus, the interior surface 704 is adjacent to the surface of the animal and, consequently, is more protected than the exterior surface (not shown). This design aids in preventing water or another substance from damaging the antenna 406 by penetrating the cavities 702.

Figure 8:
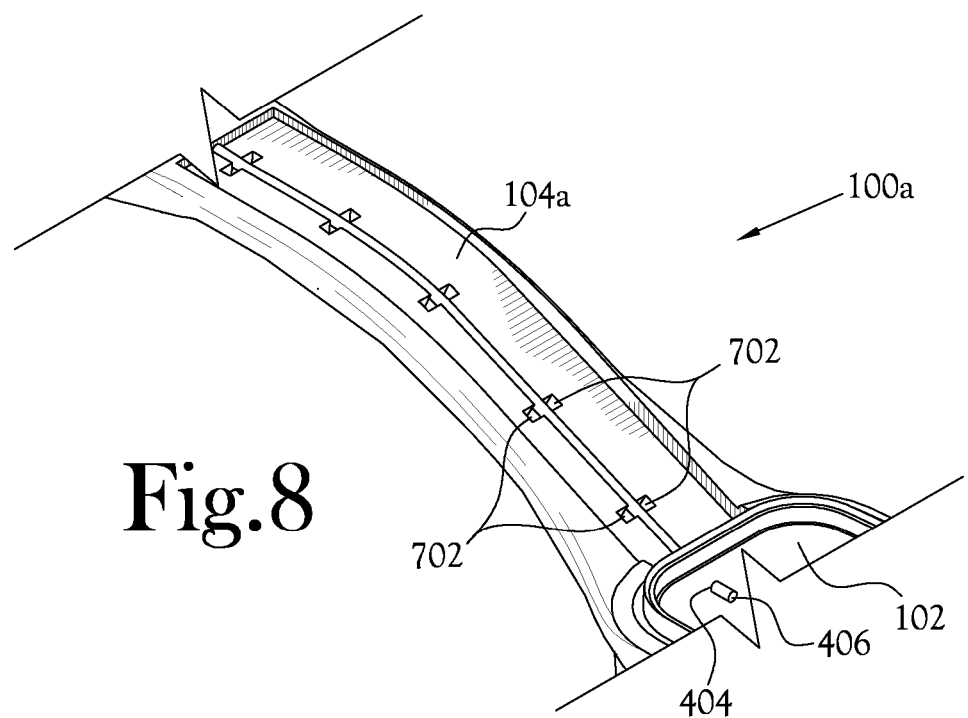
FIG. 8 is a cutaway of a partial view of the embodiment of the apparatus of the present invention depicted in FIG. 7.

FIG. 8 depicts the same partial view as in FIG. 7, except that in FIG. 8 part of the interior surface 704 has been cutaway to reveal further the configuration of the flexible member 104a, the antenna 406, and the cavities 702.

Figure 9:
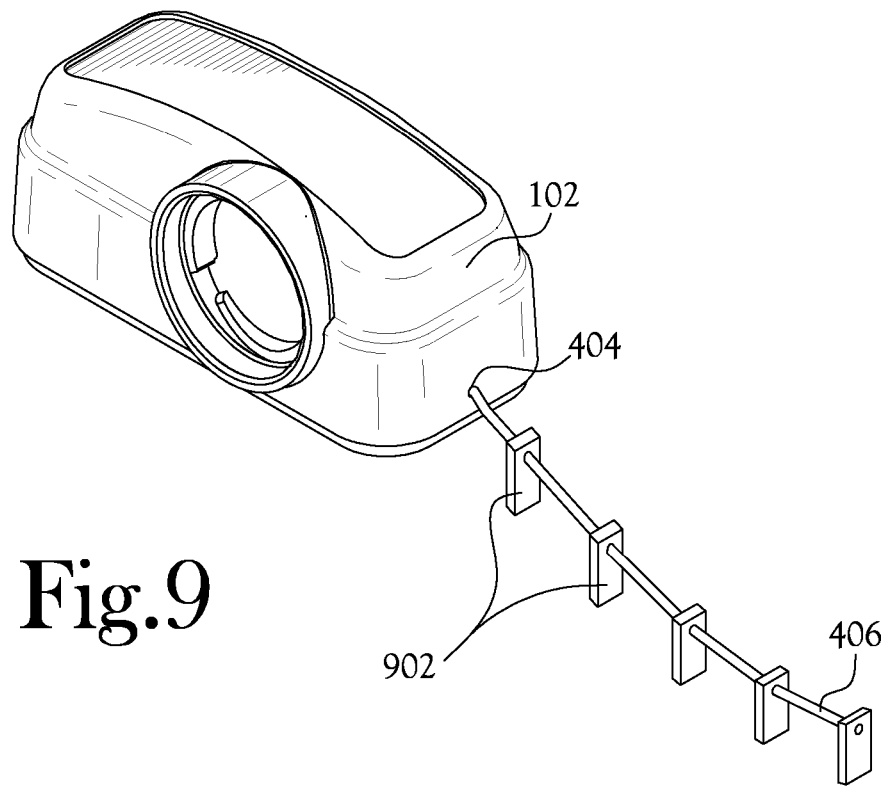
FIG. 9 is a perspective view of the rigid placeholders, the housing, and the antenna.

FIG. 9 relates to the second of the three methods presented herein for manufacturing the improved apparatus 100. The second method requires the rigid placeholders 902 depicted in FIG. 9. The rigid placeholders 902 are formed by molding material around selected parts of the antenna 406. Thereafter, the antenna 406, including the rigid placeholders 902, is placed in the flexible member mold (not shown), and the antenna 406 is maintained in position by the rigid placeholders 902, in preparation for the molding process that forms the flexible member 104. Also, the housing 102 is placed in the flexible member mold (not shown) and is secured in position. These steps ensure that the antenna 406, during the manufacture of the flexible member 104, remains in proper position relative to the housing 102 and the through-opening 404. After the antenna 406 is secured in position by the rigid placeholders 902, uncured material is forced by an injection molding apparatus into the flexible member mold (not shown), where it surrounds the antenna 406 and selected parts of the housing 102. Thereafter, the uncured material is cured, forming the flexible member 102, within which the antenna 406 is enclosed.

Figure 10:
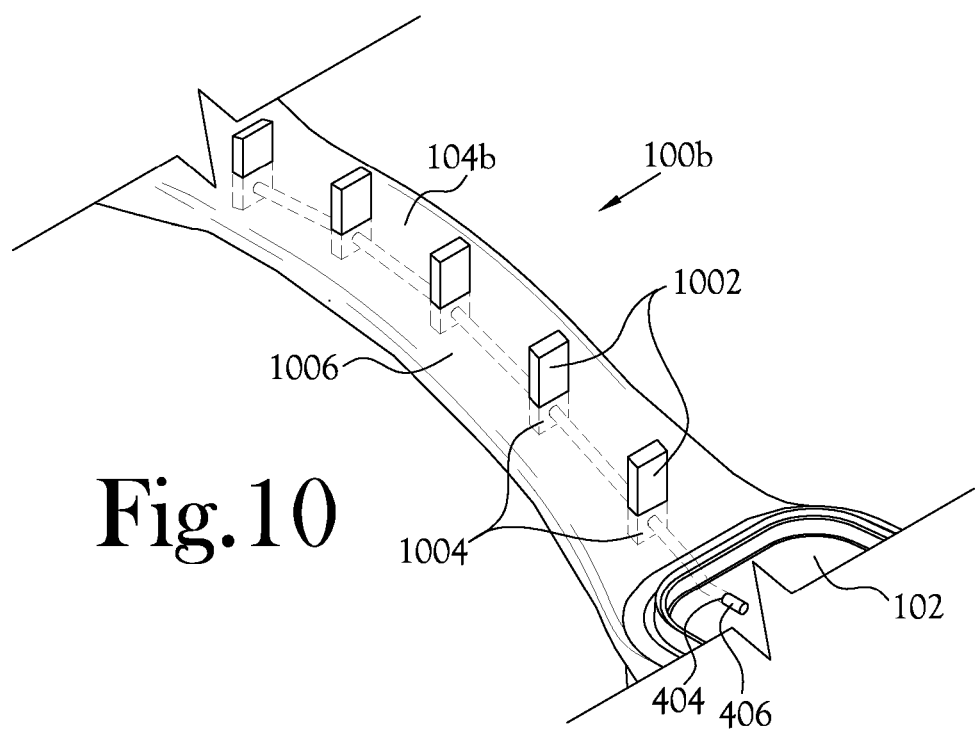
FIG. 10 is a partial view of an embodiment of the apparatus of the present invention immediately following manufacture of the flexible member, using the rigid placeholders depicted in FIG. 9.

FIG. 10 depicts a partial view of an embodiment of the improved apparatus 100b nearing completion of manufacture using the second method, i.e., the method requiring the rigid placeholders 902. Both of the molding steps already have been completed and, thus, the rigid placeholders 902 and the flexible member 104b have been formed. FIG. 10 shows the flexible member 104b, the housing 102, the antenna 406, and the through-opening 404. Additionally, FIG. 10 shows the exposed sections 1002 of the rigid placeholders 902 as well as the embedded sections 1004 of the rigid placeholders 902. The exposed sections 1002 are protruding from the interior surface 1006 of the flexible member 104b and must be trimmed.

Figure 11:
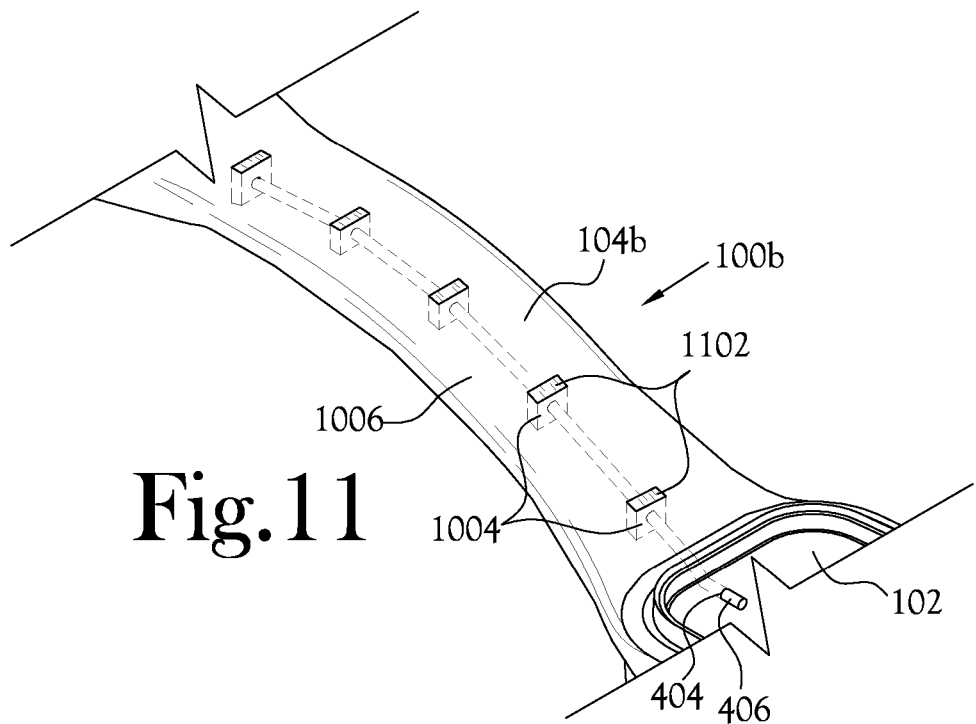
FIG. 11 is a partial view of the embodiment of the apparatus of the present invention depicted in FIG. 10, after the exposed sections of the rigid placeholders have been trimmed.

FIG. 11 depicts the same partial view as in FIG. 10, except that in FIG. 11 the exposed sections 1002 of the rigid placeholders 902 have been trimmed and, therefore, no longer are present. The interior surface 1102 of each of the embedded sections 1004 of the rigid placeholders 902 is flush with the interior surface 1006 of the flexible member.

Figure 12:
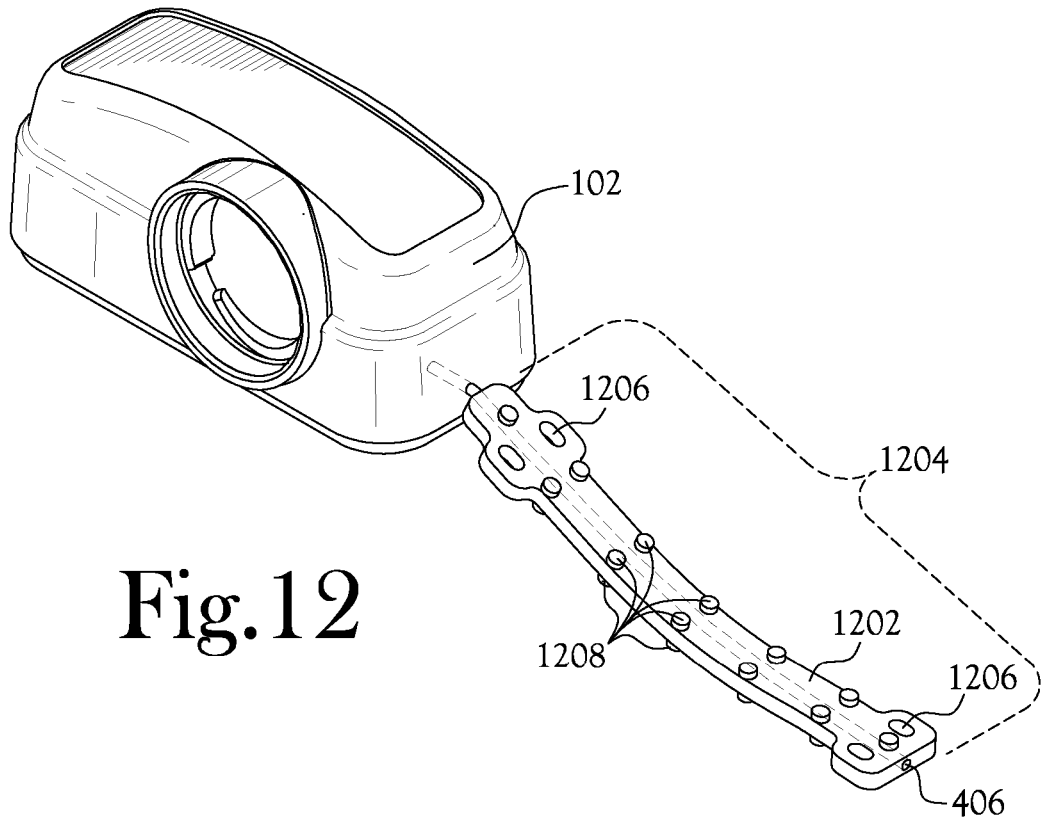
FIG. 12 is a perspective view of an embodiment of the flexible placeholder of the present invention, the housing, and the antenna.

FIG. 12 concerns the third of the three methods presented herein for manufacturing the improved apparatus 100. The third method requires the flexible placeholder 1202. The flexible placeholder 1202 is manufactured by first securing the placeholder section 1204 of the antenna 406 in a flexible placeholder mold (not shown) such that the placeholder section 1204 assumes and maintains the desired position, such as a linear configuration. For example, one way to ensure that the placeholder section 1204 of the antenna 406 maintains a linear configuration is to stretch the antenna 406 so that it has no give or slack and suspend it in the flexible placeholder mold (not shown). After the placeholder section 1204 has assumed the desired position, linear or otherwise, uncured material (e.g., rubber or other polymeric material) is injected into the flexible placeholder mold (not shown), where it surrounds the placeholder section 1204 of the antenna 406 while assuming the overall form of the flexible placeholder 1202. Thereafter, the uncured material is cured, forming the flexible placeholder 1202, within which the placeholder section 1204 of the antenna 406 is enclosed.

The flexible placeholder 1202, as shown in the embodiment illustrated in FIG. 12, defines alignment holes 1206 to allow for securing it in proper position in the flexible member mold (not shown), in preparation for the molding process that forms the flexible member 102. The flexible placeholder 1202 defines also a plurality of bosses, such as those depicted at 1208. The bosses 1208 provide support for the flexible placeholder 1202 so that, upon its 1202 placement in the flexible member mold (not shown), there are gaps between a majority of the surface of the flexible placeholder 1202 and the interior surface of the flexible member mold (not shown). During the next molding process, which forms the flexible member 104c and is described in the following paragraph, these gaps serve as channels for the uncured material, enabling it to envelop the flexible placeholder 1202.

The next step is to place the flexible placeholder 1202, including the antenna 406, in the flexible member mold (not shown). The antenna 406 is maintained in position by the flexible placeholder 1202, which is maintained in position by the bosses 1208 and by projections (not shown), defined by the flexible member mold (not shown), that engage the alignment holes 1206. Also, the housing 102 is placed in the flexible member mold (not shown) and is secured in position. These steps ensure that the flexible placeholder 1202 (and, hence, the antenna 406) remains in proper position relative to the housing 102 and the through-opening 404 during the manufacture of the flexible member 104. Next, uncured material is forced by an injection molding apparatus into the flexible member mold (not shown), where it surrounds the flexible placeholder 1202, the antenna 406, and selected parts of the housing 102. Thereafter, the material is cured, forming the flexible member 102c, within which the flexible placeholder 1202 and the antenna 406 are enclosed, and to which the housing 102 is attached.

Figure 13:
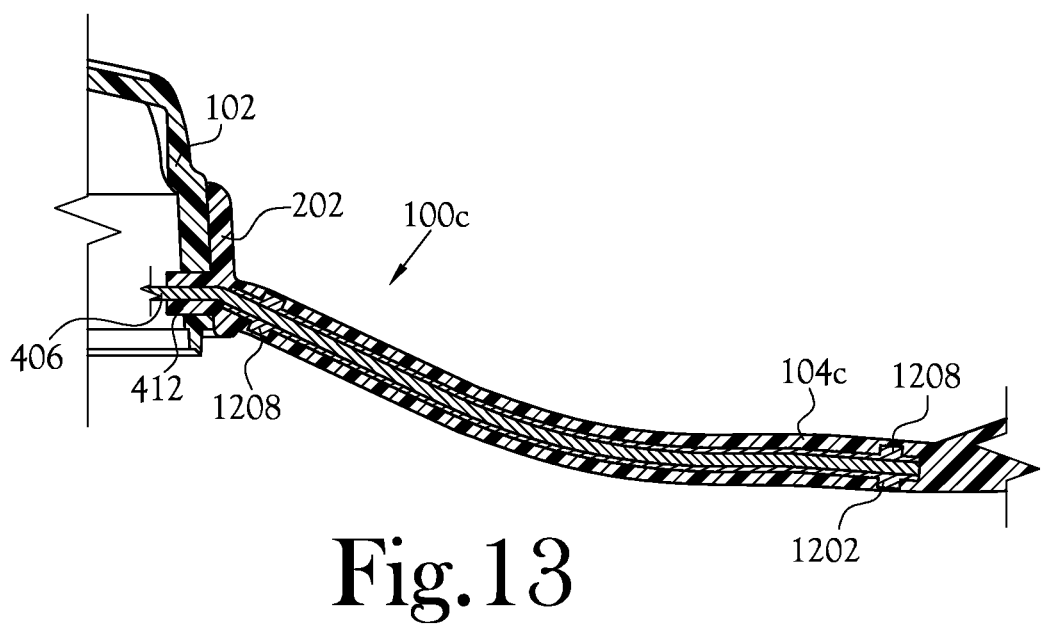
FIG. 13 is an enlarged partial cross-sectional view, taken along lines 13-13 of FIG. 3, of an embodiment of the apparatus of the present invention manufactured using the flexible placeholder depicted in FIG. 12.

FIG. 13 is a partial cross-sectional view, taken along lines 13-13 of FIG. 3, of an embodiment of the improved apparatus 100c that was manufactured using the third method, i.e., the method requiring the flexible placeholder 1202. FIG. 13 discloses the configuration of the housing 102, the flexible member 104c, the flexible placeholder 1202, the through-opening 404, the flexible member flash 412, and the antenna 406.

Figure 14:
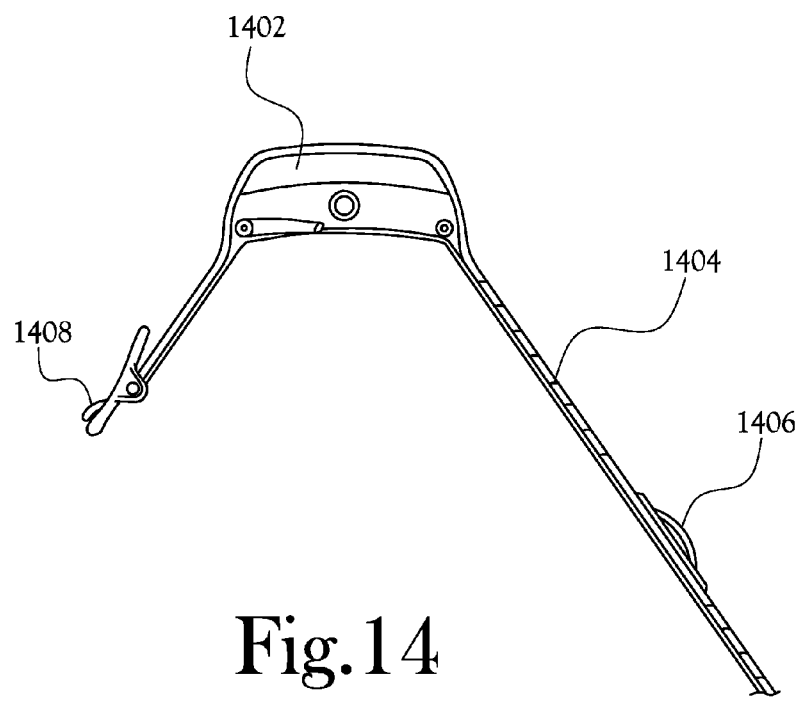
FIG. 14 is a side elevation view of one embodiment of a housing incorporating the collar having an integrated wire and GPS antenna.

FIG. 14 illustrates one embodiment of a housing 1402 having a flexible collar 1404 with a global positioning system (GPS) antenna 1406 molded into the collar. The GPS antenna is connected to the electronics in the housing by an electrical conductor 1604 (see FIGS. 16, 17) molded into the collar 1404. In the illustrated embodiment, the collar 1404 is a two-part collar having a buckle 1408.

Figure 15:
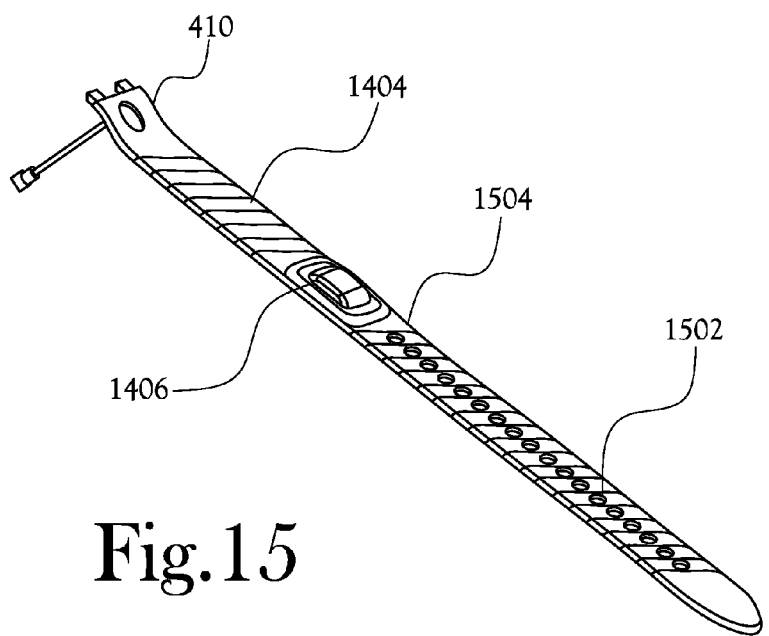
FIG. 15 is an isometric view of one embodiment of the collar strap incorporating the integrated wire and the GPS antenna.

FIG. 15 illustrates one embodiment of one strap 1502 of the collar 1404 that contains the integrated electrical conductor and the GPS antenna 1406. The GPS antenna is generally located in a central region 1504 of the collar strap such that the GPS antenna 1406 is positioned on the back of the animal's neck when the collar 1404 is secured around the neck of the animal. The actual location of the GPS antenna 1406 along the collar strap 1502 can vary depending on factors such as the length of the collar strap 1502 and the diameter of the neck of the animal for which the collar 1404 is intended. The diameter of the animal's neck will generally fall within a range that allows the GPS antenna 1406 to be located somewhere along the upwardly facing half circle of the collar when the collar 1404 is secured to the animal's neck. This places the GPS antenna 1406 in a generally upwardly facing position such that the GPS antenna 1406 has a clear view of the sky to improve GPS signal reception.

Figure 16:
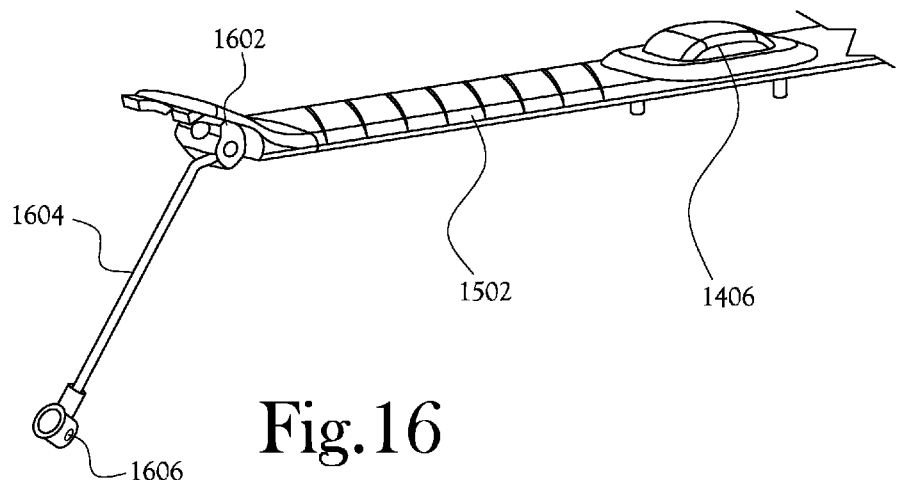
FIG. 16 illustrates a portion of one embodiment of the collar strap incorporating the integrated wire and the GPS antenna.

FIG. 16 illustrates the mating end 1602 of the collar strap 1502 that mates with the housing 1402 (see FIG. 14). The electrical conductor 1604 exits the collar strap through the mating end 1602. The electrical conductor 1604 terminates with an electrical connector 1606, such as a snap fit connector. The electrical conductor 1604 is a flexible wire that allows the electrical connector 1606 to be positioned to allow interconnection with a cooperating electrical connector elsewhere on the housing 1402 or the collar 1404. In one embodiment, the electrical conductor 1604 is an insulated wire that protects the externally exposed portion of the electrical conductor 1604 from moisture and damage.

Figure 17:
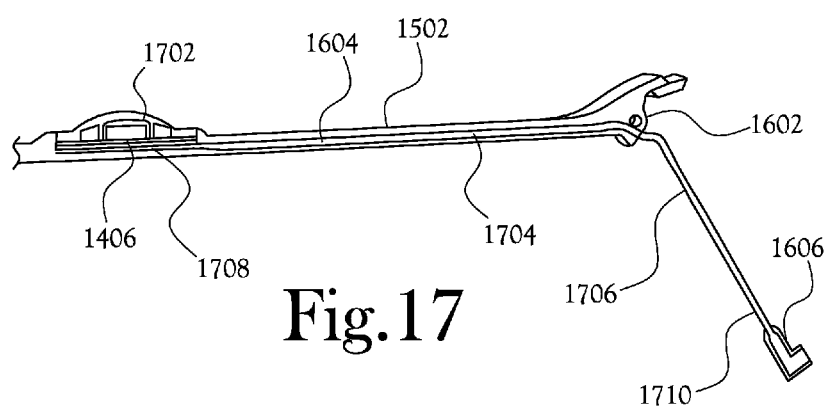
FIG. 17 is a side elevation x-ray view of a portion of one embodiment of the collar strap incorporating the integrated wire and the GPS antenna.

FIG. 17 illustrates an x-ray view of the collar strap 1502 showing the embedded electrical conductor 1604 and the embedded GPS antenna 1406. In one embodiment, the electrical conductor 1604 and electrical connector 1606 are part of the GPS antenna assembly. In another embodiment, one end 1708 of a separate electrical conductor is electrically connected to the GPS antenna, for example, by soldering the conductor to the GPS antenna, and the electrical connector is attached to the opposite end 1710 of the electrical conductor. In the illustrated embodiment, the GPS antenna is embedded into the collar strap by placing the GPS antenna in a GPS antenna casing that offers protection for the GPS antenna. In one embodiment, the GPS antenna casing is then inserted into a mold in direct contact with the mold shutoff surfaces. The electrical conductor is positioned within the mold according to any of the various techniques described herein. In the embodiments illustrated in FIGS. 14-18, the electrical conductor is held in place using steel fingers in the mold that leave pairs of holes in the collar strap when the part is removed from the tool. Once the electrical conductor and the GPS antenna are positioned in the mold, the flexible material is injected into the mold and bonds with the plastic housing and the electrical connector.

The embedded electrical conductor includes a first portion 1704 that is molded into the collar strap 1502 and a second portion 1706 that exits from the mating end 1602 of the collar strap 1502 and is exposed.

In one embodiment, the GPS antenna casing is a plastic material. In another embodiment, the GPS antenna casing is a metal material that does not interfere with GPS signal reception. In another embodiment, only a portion of the GPS antenna casing is molded into the collar strap to secure it in position and leaving a portion of the GPS antenna casing exposed. In a still further embodiment, the GPS antenna is not placed within a casing.

Figure 18:
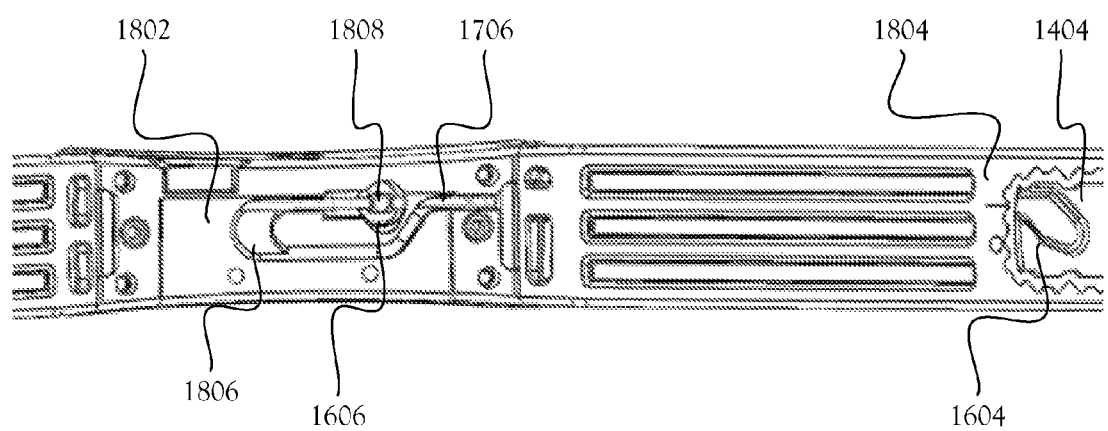
FIG. 18 is bottom plan view of one embodiment of the housing and a portion of the collar strap incorporating the integrated wire and the GPS antenna.

FIG. 18 illustrates the inner surface of the assembled apparatus of FIG. 14 showing inner surface 1802 (bottom) of the housing and the inner surface 1804 of the collar strap. The bottom 1802 of the housing defines a channel 1806 that receives, guides, and holds the exposed portion of the electrical conductor 1706 extending from the collar strap 1502. In the illustrated embodiment, an electrical connector 1808 linked to the internal circuitry of the housing is located near one end of the channel 1806. The housing electrical connector 1808 is complimentary to the electrical connector 1606 at the end of the exposed portion 1706 of the electrical conductor 1604. When the housing electrical connector 1808 and the collar strap electrical connector 1606 are connected, the GPS antenna 1404 is placed in electrical communication with the electrical circuitry within the housing 1402. The electrical connectors 1606, 1808 are generally releasable connectors allowing for substitution or replacement of the collar strap in case of damage to the strap, damage to the electrical conductor, or failure of the GPS antenna and other similar occurrences.

FIG. 18 also shows a cut-away portion of the inner surface of the collar strap at the location of the GPS antenna showing the routing and interconnection of the electrical conductor 1604 to the GPS antenna 1404.

One skilled in the art will recognize that certain applications may require enclosing an electrical conductor other than an antenna in the flexible member or flexible placeholder. Depending on the nature of the application, that electrical conductor either may replace, or coexist with, the antenna.

For example, in still another embodiment of the improved apparatus, only the middle section of an electrical conductor is embedded in the flexible placeholder, leaving both ends available for insertion into housings via through-openings. In this embodiment, the electrical conductor forms a conductive connection between two electronic components, each of which is enclosed in its own housing. This embodiment aids in distributing more evenly the weight and bulk of two or more electronic components around the neck or other part of an animal.

While the present invention has been illustrated by description of several embodiments and while the illustrative embodiments have been described in detail, it is not the intention of the applicant to restrict or in any way limit the scope of the appended claims to such detail. Additional modifications will readily appear to one skilled in the art. For example, one skilled in the art will recognize that, in some instances, it may be preferable, when manufacturing the flexible member or flexible placeholder, to use molding methods other than injection molding, such as extrusion molding, transfer molding, or compression molding. Thus, the invention in its broader aspects is not limited to the specific details, representative apparatus and methods, and illustrative examples shown and described. Accordingly, departures may be made from such details without departing from the spirit or scope of applicant's general inventive concept.

What is claimed is:

1. An electronic animal locating apparatus comprising:
a housing having an inner surface facing toward the animal when worn by the animal;
a first electrical connector located on said housing and externally accessible to provide a connection to circuitry internal to said housing;
a collar having a first end releasably secured to said housing;
a global positioning system (GPS) antenna, at least a portion of which is integrally molded into said collar at a selected distance away from said first end such that said GPS antenna is remotely located from said housing;
an electrical conductor in electrical communication with said GPS antenna, said electrical conductor having a portion of said electrical conductor being integrally molded into said collar and a second portion of said electrical conductor exiting said collar proximate to said first end, said second portion of said electrical conductor being flexible; and
a second electrical connector electrically connected to the exposed end of said second portion of said electrical conductor, said second electrical connector being complimentary to said first electrical connector allowing said first electrical connector and said second electrical connector to be placed in electrical communication.

2. The electronic animal locating apparatus of claim 1 characterized in that:
said housing has an inner surface facing toward the animal when worn by the animal, said inner surface defining a channel;
said first electrical connector is located within said channel; and
said second portion of said electrical conductor is received within said channel.

3. The electronic animal locating apparatus of claim 1 characterized in that said GPS antenna is located along said collar in a position where said GPS antenna is generally upwardly facing when said collar is secured around the animal's neck with said housing positioned proximate to the animal's throat.

4. An animal locating apparatus comprising:
a collar to be worn by an animal;
a housing connected to a first end of the collar and including an inner surface facing toward the animal when the collar is worn by the animal, the housing including electronic circuitry to communicate via radio waves with a remote electronic device;
a global positioning system (GPS) antenna mounted to the collar and spaced apart from the first end; and
an electrical conductor connected to the GPS antenna and having a first portion at least partially enclosed within the collar, the electrical conductor including a first end receivable by the housing to electrically connect the GPS antenna to the electronic circuitry.

5. The animal locating apparatus of claim 4, wherein at least a portion of the electronic circuitry is internal to the housing, and the housing includes a through-opening to receive the first end therein.

6. The animal locating apparatus of claim 4, further comprising:
a first connector disposed on the housing; and
a second connector complimentary to the first connector and disposed on the first end of the electrical conductor to releasably connect the GPS antenna to the electronic circuitry.

7. The animal locating apparatus of claim 6, wherein the electrical conductor includes a second end opposite the first end to releasably connect the GPS antenna to the electrical conductor.

8. The animal locating apparatus of claim 7, wherein the first and/or second ends exit the collar.

9. The animal locating apparatus of claim 6, wherein the inner surface includes a channel to receive the first end of the electrical conductor to the first connector.

10. The animal locating apparatus of claim 4, wherein the GPS antenna is spaced apart from the housing such that the GPS antenna is located proximate to the back of the animal's neck when the collar is worn by the animal and the housing is positioned proximate to the animal's throat.

* * * * *